(12) United States Patent
Fishback et al.

(10) Patent No.: US 11,131,213 B2
(45) Date of Patent: Sep. 28, 2021

(54) ENGINE COMPONENT WITH COOLING HOLE

(71) Applicant: General Electric Company, Schenectady, NY (US)

(72) Inventors: Kelli Marie Fishback, Liberty Township, OH (US); Jonathan Russell Ratzlaff, Loveland, OH (US); Steven Robert Brassfield, North Bend, OH (US); Kurt Thomas Whittington, Maineville, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/733,377

(22) Filed: Jan. 3, 2020

(65) Prior Publication Data

US 2021/0207493 A1 Jul. 8, 2021

(51) Int. Cl.
*F01D 5/12* (2006.01)
*F01D 25/12* (2006.01)

(52) U.S. Cl.
CPC .............. *F01D 25/12* (2013.01); *F01D 5/12* (2013.01); *F05D 2220/30* (2013.01); *F05D 2260/232* (2013.01)

(58) Field of Classification Search
CPC ... F01D 5/12; F01D 25/12; F01D 5/14; F01D 5/147; F01D 5/18; F05D 2220/30; F05D 2260/232
See application file for complete search history.

(56) References Cited

U.S. PATENT DOCUMENTS

| 5,915,923 | A | * | 6/1999 | Tomita | F01D 5/187 |
| | | | | | 416/96 R |
| 6,164,913 | A | | 12/2000 | Reddy | |
| 6,481,967 | B2 | * | 11/2002 | Tomita | F01D 5/186 |
| | | | | | 415/115 |
| 6,506,020 | B2 | * | 1/2003 | Dailey | F01D 5/18 |
| | | | | | 416/96 R |
| 7,244,101 | B2 | | 7/2007 | Lee et al. | |
| 7,322,797 | B2 | * | 1/2008 | Lee | F01D 5/22 |
| | | | | | 416/193 A |
| 7,695,243 | B2 | | 4/2010 | Lee et al. | |
| 7,819,629 | B2 | * | 10/2010 | Liang | F01D 5/187 |
| | | | | | 416/97 R |
| 8,231,348 | B2 | * | 7/2012 | Torii | F01D 5/18 |
| | | | | | 416/97 R |
| 8,262,356 | B2 | | 9/2012 | Ammann | |
| 8,864,444 | B2 | | 10/2014 | Antunes et al. | |
| 8,870,525 | B2 | * | 10/2014 | Walunj | F01D 5/187 |
| | | | | | 415/115 |
| 9,810,070 | B2 | * | 11/2017 | Johns | F01D 5/187 |
| 9,850,762 | B2 | | 12/2017 | Molter et al. | |

(Continued)

FOREIGN PATENT DOCUMENTS

WO 2010103113 A2 9/2010

*Primary Examiner* — Igor Kershteyn
(74) *Attorney, Agent, or Firm* — McGarry Bair PC (57) ABSTRACT

An airfoil assembly for a turbine engine that includes a platform, a dovetail, an airfoil. The airfoil assembly can further include a cooling air circuit that fluidly connects to a platform cooling passage. The cooling air circuit and platform cooling passage can be contained within or housed at least in part by the platform, the dovetail, or the airfoil. The cooling air circuit can also include a deflector.

20 Claims, 7 Drawing Sheets

(56) References Cited

U.S. PATENT DOCUMENTS

| 10,036,284 B2 | 7/2018 | Balliel et al. |
| 2012/0014810 A1 | 1/2012 | Antunes et al. |
| 2019/0145266 A1 | 5/2019 | Crites et al. |

* cited by examiner

ENGINE COMPONENT WITH COOLING HOLE

TECHNICAL FIELD

This disclosure generally relates to cooling air circuits in engine components, and more particularly to a cooling air circuit fluidly connected to a platform cooling passage.

BACKGROUND

Turbine engines, and particularly gas or combustion turbine engines, are rotary engines that extract energy from a flow of combusted gases passing through the engine onto a multitude of rotating turbine blades, which can be arranged in multiple turbine blade assemblies.

In one configuration, turbine blade assemblies include the turbine airfoil, such as a stationary vane or rotating blade, with the blade having a platform and a dovetail mounting portion. The turbine blade assembly includes at least one cooling inlet passage that can provide cooling air to the platform or the airfoil.

Dust and particles entrained in the cooling air can accumulate in the platform. The accumulated dust and particles, over time, can reduce the heat transfer of the surrounding area of the platform, we can lead to hot spots that shorten the life cycle of the blade.

BRIEF DESCRIPTION

In one aspect, the present disclosure relates to an airfoil assembly for a turbine engine that includes a platform having upper and lower opposing surfaces, a dovetail depending from the lower surface, an airfoil extending from the upper surface and having an outer wall bounding an interior and defining a pressure side and a suction side extending between a leading edge and a trailing edge to define a chord-wise direction and extending radially between a root and a tip to define a span-wise direction, with the root being adjacent the platform, a cooling air circuit passing through the dovetail and extending into the interior of the airfoil, a platform cooling passage extending into the platform and having a platform inlet fluidly coupled to the cooling air circuit, and a deflector provided in the cooling air circuit upstream of the platform inlet.

In another aspect, the present disclosure relates to an airfoil assembly for a turbine engine that includes a platform having first and second opposing surfaces, an airfoil extending from one of the first and second surfaces and having an outer wall bounding an interior and defining a pressure side and a suction side extending between a leading edge and a trailing edge to define a chord-wise direction and extending radially between a root and a tip to define a span-wise direction, with the root being adjacent the one of the first and second surfaces, a cooling air circuit extending into the airfoil interior, a platform cooling passage extending into the platform and having a platform inlet fluidly coupled to the cooling air circuit, and a deflector provided in the cooling air circuit upstream of the platform inlet.

DETAILED DESCRIPTION

Aspects of the disclosure described herein are directed to an airfoil assembly that includes or houses a cooling air circuit fluidly coupled to a platform cooling passage. A deflector, located in the cooling air circuit upstream of the platform cooling passage, mitigates the accumulation of particles in the platform. For purposes of illustration, the present disclosure will be described with respect to a turbine blade in the turbine for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
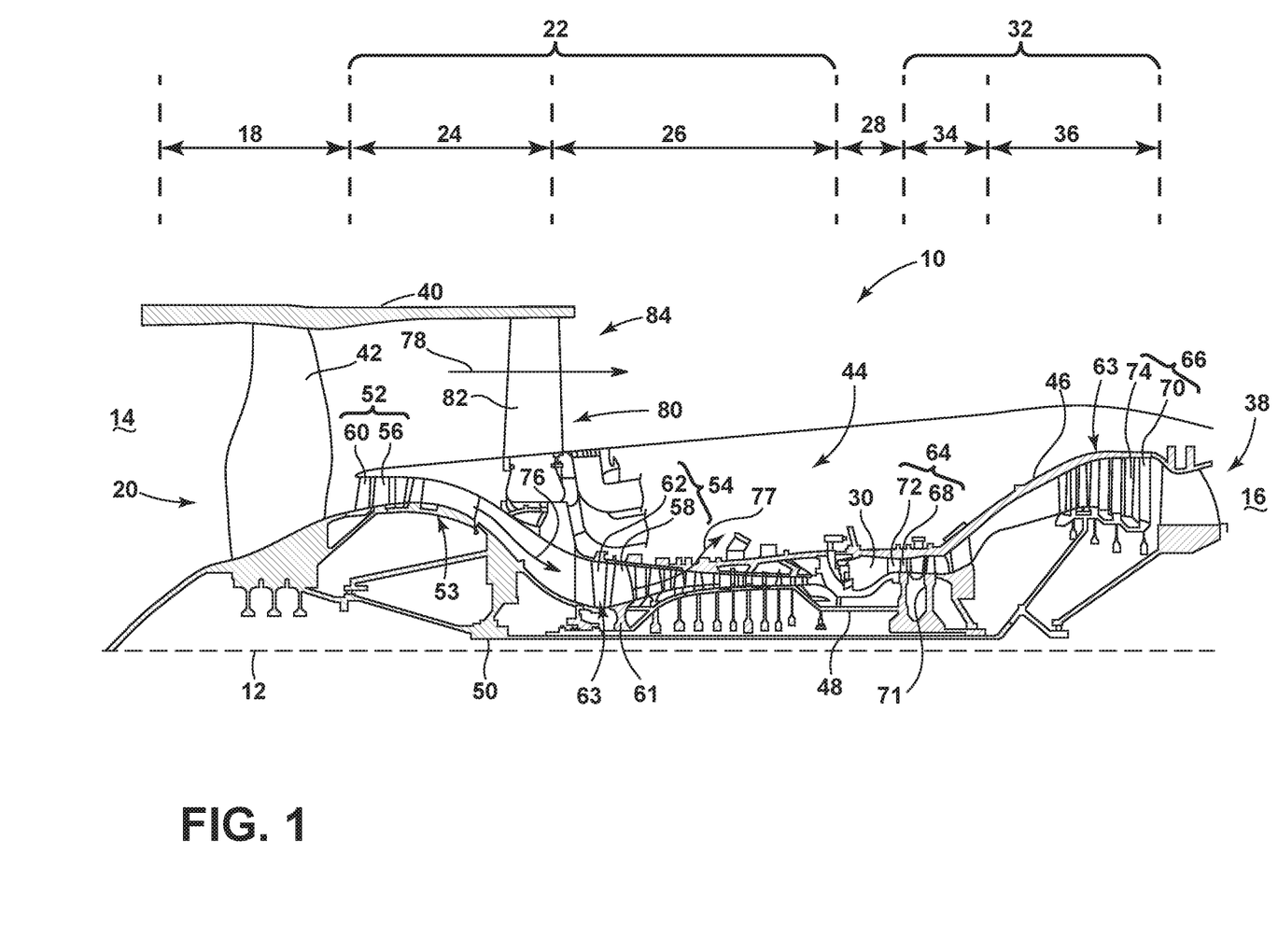
FIG. 1 is a schematic cross-sectional diagram of a turbine engine for an aircraft.

FIG. 1 is a schematic cross-sectional diagram of a gas turbine engine 10 for an aircraft. The engine 10 has a generally longitudinally extending axis or engine centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the engine centerline 12 of the engine 10 drivingly connects the HP turbine 34 to the HP compressor 26. A LP shaft or spool 50, which is disposed coaxially about the engine centerline 12 of the engine 10 within the larger diameter annular HP spool 48, drivingly connects the LP turbine 36 to the LP compressor 24 and fan 20. The spools 48, 50 are rotatable about the engine centerline 12 and couple to a plurality of rotatable elements, which can collectively define a rotor.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the engine centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine sections 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by, for example, the bleed air 77 is necessary for operating of such engine components in the heightened temperature environments.

A remaining portion of the airflow 78 bypasses the LP compressor 24 and engine core 44 and exits the engine 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
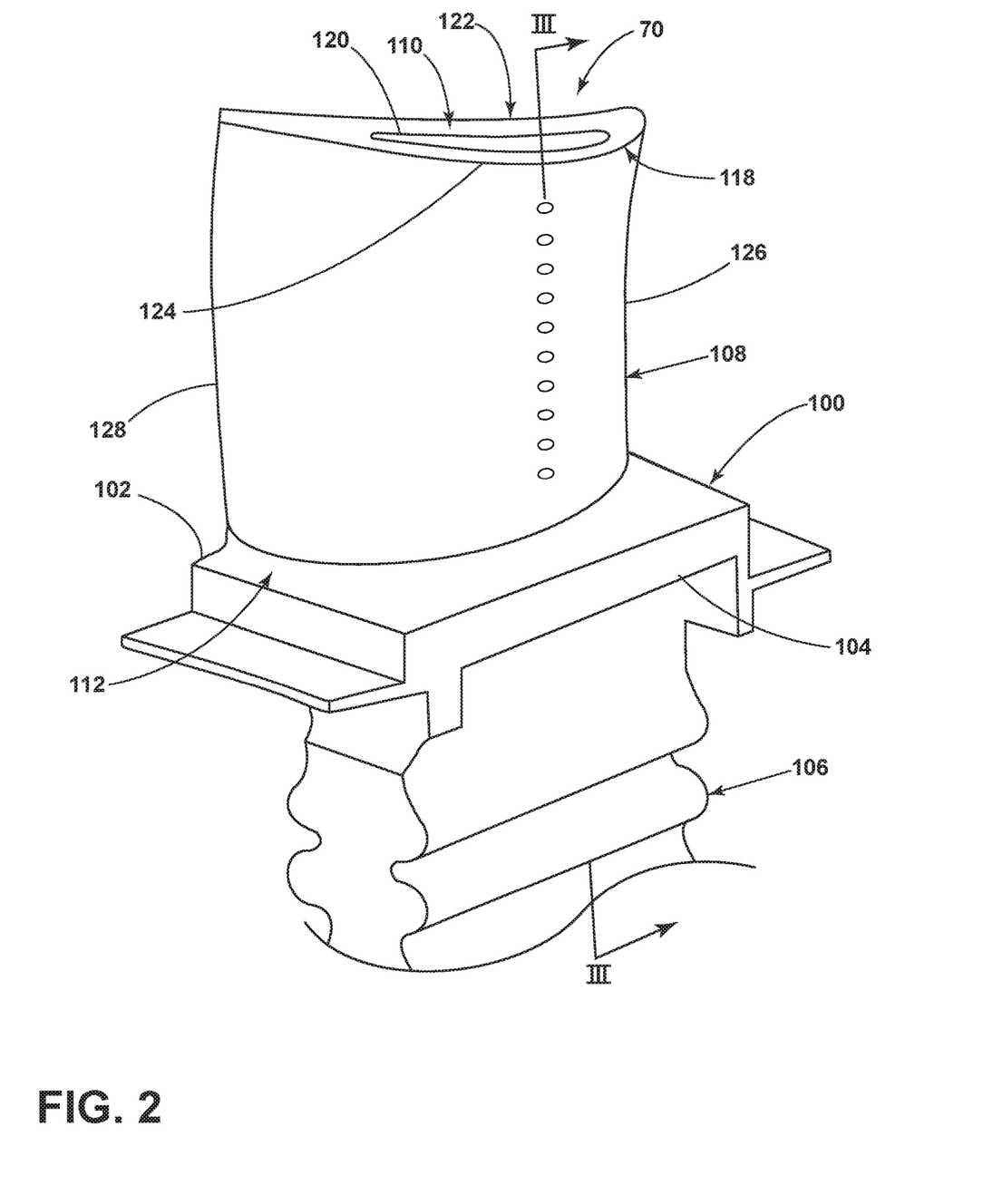
FIG. 2 is a perspective view of an airfoil assembly for the turbine engine from FIG. 1.

FIG. 2 is a perspective view of an airfoil assembly 86 for the engine 10 of FIG. 1. The airfoil assembly 86 includes a platform 100 having an upper surface 102 and a lower surface 104, a dovetail 106, and an airfoil 108. The upper and lower surfaces 102, 104 of the platform 100 can be opposing surfaces.

The airfoil 108, by way of non-limiting example, is illustrated as the rotatable turbine blade 70 of the engine 10 from FIG. 1 The airfoil 108 extends radially between a tip 110 and a root 112 to define a span-wise direction. The root 112 of the airfoil 108 mounts to the upper surface 102 of the platform 100. When multiple airfoils are circumferentially arranged in side-by-side relationship, the platform 100 helps to radially contain the turbine engine mainstream air flow. Alternatively, the airfoil assembly 86 or airfoil 108 can be or include the rotatable blade 68, the non-rotatable vane 60, 62, 72, 74, 82 a strut, a service tube, a shroud, the combustor 30, or a component of the combustor 30, or any other engine component that can require or utilize cooling passages.

An outer wall 118 binds an interior 120 of the airfoil 108. The outer wall 118 can define a concave-shaped pressure side 122 and a convex-shaped suction side 124 which are joined together to define an airfoil cross-sectional shape of the airfoil 108 extending between a leading edge 126 and a trailing edge 128 to define a chord-wise direction.

The dovetail 106 mounts to the lower surface 104 of the platform 100. That is, the dovetail 106 depends from the lower surface 104 in a radial direction relatively opposite of the airfoil 108. The dovetail 106 can be configured to mount the platform 100 or airfoil 108 to the turbine rotor disk 71 on the engine 10.

Figure 3:
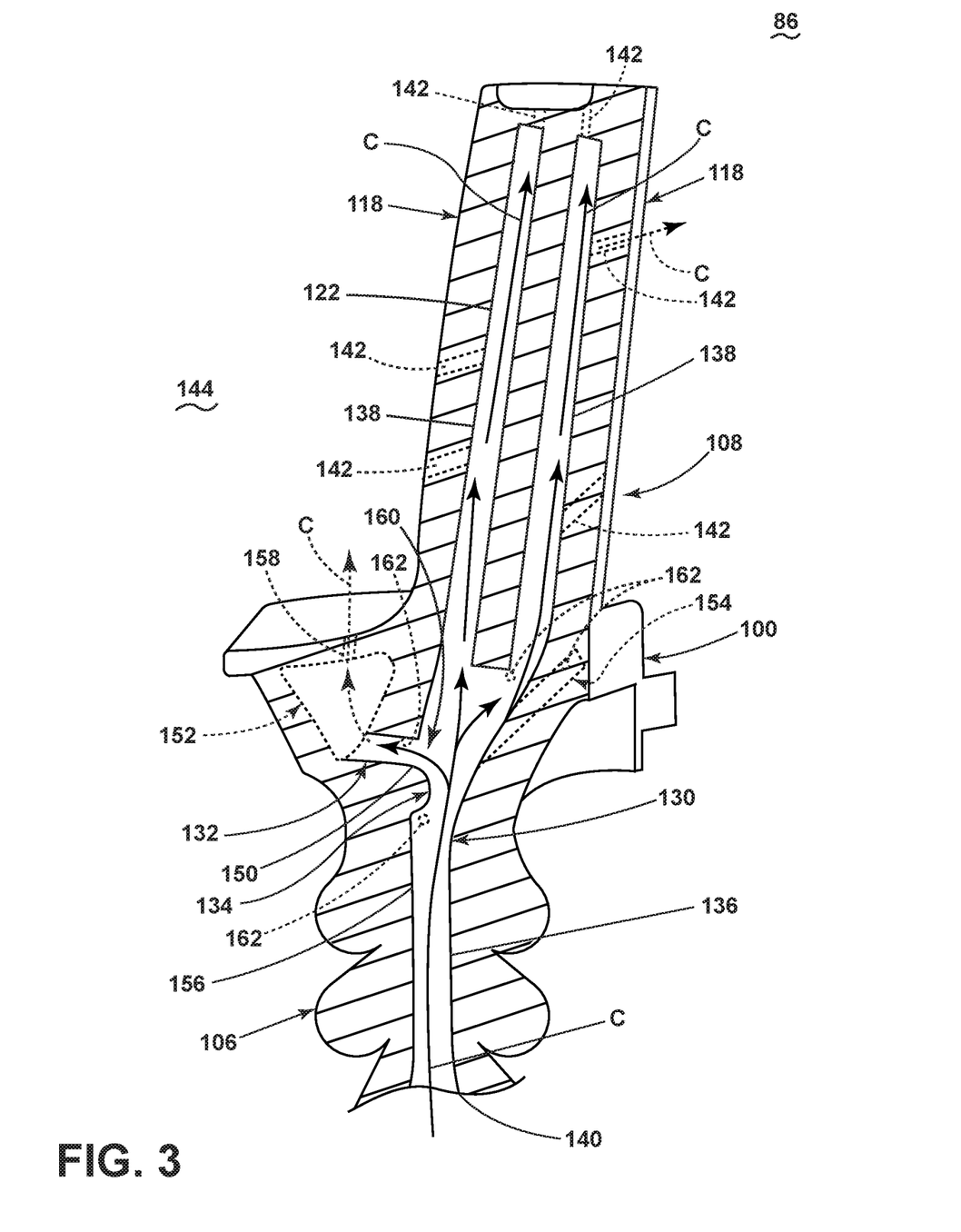
FIG. 3 is a schematic cross-section of the airfoil assembly of FIG. 2 taken along line III-III.

FIG. 3 The airfoil assembly 86 further includes a cooling air circuit 130, at least one platform cooling passage 132, and at least one deflector 134. It should be appreciated that the airfoil assembly 86 is shown in cross-section, such that the cooling air circuit 130, the platform cooling passage 132, and the deflector 134 are housed within the body of the dovetail 106, the platform 100, or the airfoil 108.

The cooling air circuit 130 passes through at least a portion of the dovetail 106 and extends into the interior 120 of the airfoil 108. At least one inlet passage 136 and at least one airfoil cooling passage 138 can define the cooling air circuit 130. A circuit inlet 140 of the inlet passage 136 can receive cooling airflow C from at source external the airfoil assembly 86. The cooling airflow C is illustrated with arrows, indicating a fluid flow direction.

The inlet passage 136 can fluidly connect the circuit inlet 140 to the at least one airfoil cooling passage 138. That is, the cooling air circuit 130 provides internal fluid communication for the cooling airflow C to extend through the dovetail 106 and the platform 100 into the airfoil 108.

While illustrated as having two airfoil cooling passages 138, it is contemplated that the cooling air circuit 130 or the airfoil assembly 86 can include any number of airfoil cooling passages 138. Optionally, at least one cooling hole or cooling outlet 142 can fluidly connect the at least one airfoil cooling passage 138 to an exterior 144 of the airfoil assembly 86.

The cooling outlet 142 can pass through a substrate, which by way of illustration is outer wall 118. It should be understood, however, that the substrate can be any wall within the engine 10 including but not limited to interior walls, a tip wall, or a combustion liner wall.

In addition to providing the cooling airflow C to the airfoil cooling passages 138, the inlet passage 136 of the cooling air circuit 130 can also provide internal fluid communication with the platform cooling passage 132.

A platform inlet 150 can be fluidly connected to the inlet passage 136 of the cooling air circuit 130 to the platform cooling passage 132. The platform cooling passage 132 provides at least a portion of the cooling airflow C from the cooling air circuit 130 to at least a portion of the platform 100. The platform cooling passage 132 can be housed within the body of the dovetail 106, the platform 100, or a combination therein.

By way of non-limiting example, a cavity 152 housed within the platform 100, can be fluidly connect to the platform cooling passage 132. It is contemplated that the cavity 152 is coupled to at least one platform outlet 158, where the at least one platform outlet 158 can be any known cooling hole or outlet. It is further contemplated that the cavity 152 can be coupled to at least one conduit to direct the flow of cooling air through the platform 100. Additionally, or alternatively, the platform cooling passage 132 can fluidly connect any portion, conduit, or outlet of the airfoil assembly 86. While illustrated as a single platform cooling passage 132, any number of platform cooling passages are contemplated.

Optionally, the cooling air circuit 130 or the platform cooling passage 132, can include at least one dead-end cavity 154. By way of non-limiting example, the at least one dead-end cavity 154 can be a ball brazed cavity.

The deflector 134 is provided in the cooling air circuit 130 upstream of the platform inlet 150 for the platform cooling passage 132. The deflector 134 can project into the cooling air circuit 130. The deflector 134 can be formed unitarily with the dovetail 106 or the platform 100. Additionally, or alternatively, the deflector 134 can be formed, fastened or otherwise attached to a wall 156 of the cooling air circuit 130 at any location upstream of the platform inlet 150.

A turn 160 for cooling airflow C leaving the cooling air circuit 130 and entering the platform inlet 150 can, in part, be formed by the deflector 134. By way of non-limiting example, the deflector 134 can, at least in part, define a portion of the platform inlet 150.

Optionally, at least one hole 162 can be located in the cooling air circuit 130, the inlet passage 136, the dead-end cavity 154, the platform cooling passage 132, or the deflector 134. The at least one hole 162 can encourage particles in the cooling airflow C to exit the cooling air circuit 130, the inlet passage 136, the dead-end cavity 154, the platform cooling passage 132, or the deflector 134 at the at least one hole 162.

Figure 4:
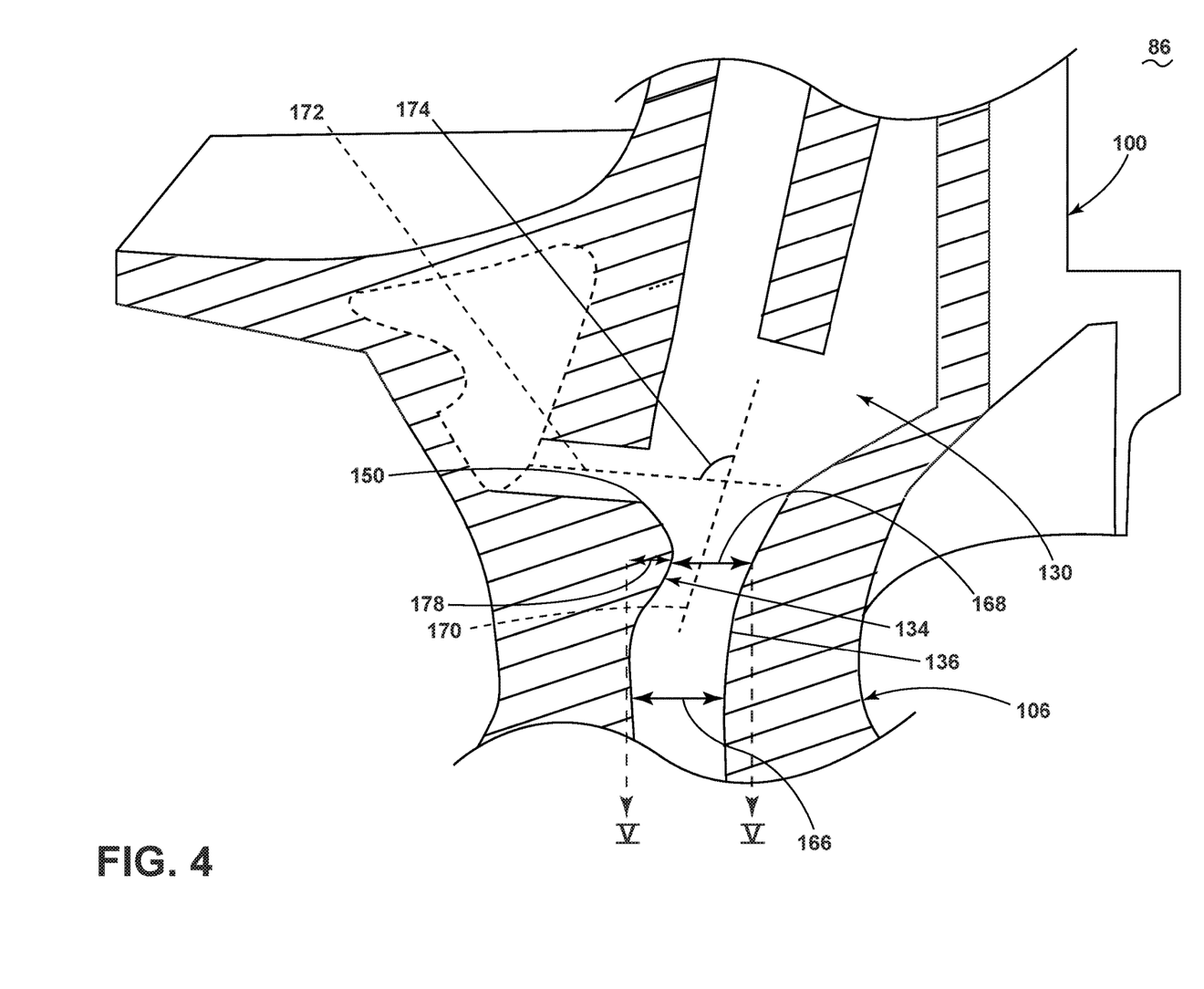
FIG. 4 is an enlarged schematic cross-section of a portion of the airfoil assembly of FIG. 3.

FIG. 4 is an enlarged view of a portion of the airfoil assembly 86, further illustrating the deflector 134 protruding into the inlet passage 136. A first diameter 166 can be taken within the dovetail 106 or platform 100 and upstream of the deflector 134. A second diameter 168 can be taken at the deflector 134. The first diameter 166 is greater than the second diameter 168, where the second diameter 168 can define a reduced cross-sectional area in at least one dimension. That is, the deflector 134 at least locally reduces a cross-sectional area of the cooling air circuit 130 at the deflector 134. Specifically, the deflector 134 can be a bump-out deflector wherein the only changes are in a single dimension in that cross-section, but there can be a corresponding dimension change in a second or the orthogonal dimension that yields a constant cross-section area or even an increasing cross-sectional area.

A first centerline 170 extends through the inlet passage 136 and past the platform inlet 150, indicating a center of the cooling air circuit 130. A second centerline 172 can extend through the platform cooling passage 132 and the platform inlet 150. The turn 160 can be measured as an angle 174 between the first centerline 170 and the second centerline 172. The turn 160 can have an angle between and including 5 to 150 degrees.

As illustrated, by way of non-limiting example, the deflector 134 can have a generally curved shape having a radius of curvature 178. However, any shape deflector 134 is considered that protrudes or penetrates into the cooling air circuit 130 or inlet passage 136.

Figure 5:
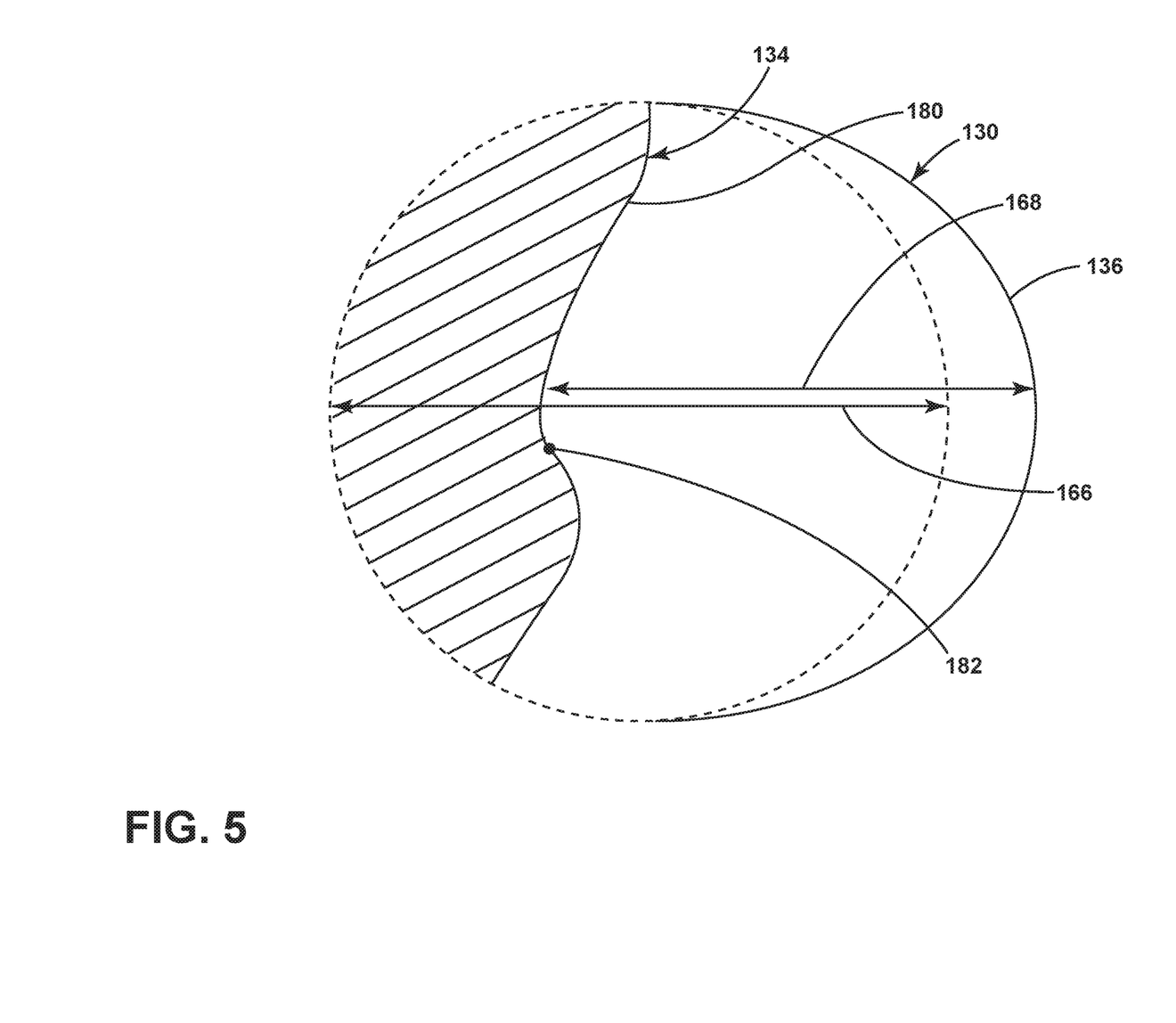
FIG. 5 is a cross-section of a cooling air circuit of the airfoil assembly of FIG. 5 taken along line V-V.

FIG. 5 illustrates in greater detail the deflector 134 at least locally reducing the cross-sectional area of the cooling air circuit 130. While illustrated as circular, the inlet passage 136 of can be oval or otherwise shaped. A contoured surface 180 of the deflector 134 can be curved, linear, or include both features. Optionally the contoured surface 180 can include at least one inflection point 182, that is, the sign of the curvature of the contoured surface can change. FIG. 5 further illustrates the decrease in cross sectional area due to the deflector 134, as the first diameter 166 is greater than the second diameter 168.

In operation, as illustrated previously in FIGS. 3-5, the cooling airflow C enters the cooling air circuit 130 at the circuit inlet 140 in the dovetail 106. The cooling airflow C then passes through the inlet passage 136 of the cooling air circuit 130. The cooling airflow C is directed by the deflector 134. Downstream of the deflector 134, the cooling airflow C splits or is diverted so that a first portion of the cooling airflow C passes through the platform cooling passage 132 into a portion of the platform 100. The second portion of the cooling airflow C can pass into the airfoil cooling passage 138.

The first portion of the cooling airflow C passes through the turn 160 and into the platform cooling passage 132 via the platform inlet 150. The first portion of the cooling airflow C can exit the platform 100 via the cavity 152 or platform outlet 158.

The second portion of the cooling airflow C passes can pass into the airfoil 108 via the into the airfoil cooling passage 138. The second portion of the cooling airflow C can exit the airfoil 108 through the cooling outlet 142.

Optionally, a part of the first or second portion of the cooling airflow C or a third portion of the cooling airflow C can be directed to the dead-end cavity 154.

Particles in the cooling airflow C can exit the airfoil assembly 86 through the at least one hole 162. The at least one hole 162 can be specifically placed such that momentum of particles in the cooling airflow C encourages particles to exit the airfoil assembly 86 at the at least one hole 162.

Figure 6:
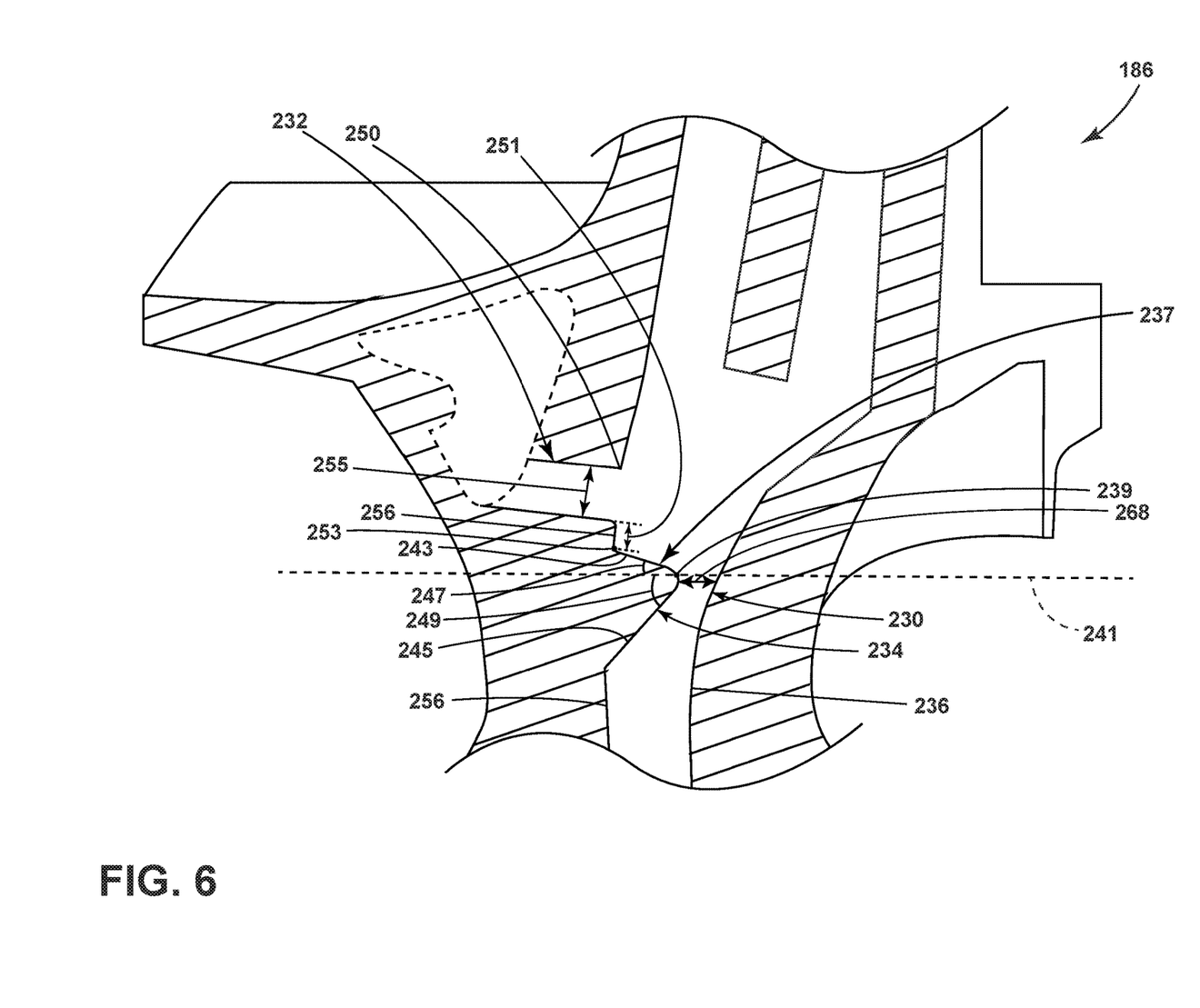
FIG. 6 is a variation of the enlarged schematic cross-section of FIG. 3.

FIG. 6 is another example of a schematic cross section of an airfoil assembly 186. The airfoil assembly 186 is similar to the airfoil assembly 86, therefore, like parts will be identified with like numerals increased by 100, with it being understood that the description of the like parts of the airfoil assembly 86 applies to the airfoil assembly 186, unless otherwise noted.

The airfoil assembly 186 can include a cooling air circuit 230, a platform cooling passage 232, and a deflector 234. The deflector 234 can extend into the inlet passage 236 of the cooling air circuit 230. The deflector 234, by way of non-limiting example, can form a ramp 237.

A peak 239 can located at the apex of the ramp 237. While illustrated as rounded or curved, it is contemplated that the peak 239 can be pointed or sharp. An axial line 241 can be drawn through the peak 239.

A first side 243 of the ramp 237 extends upstream from the peak 239 to a wall 256 of the inlet passage 236. A second side 245 of the ramp 237 can extend from the peak 239 downstream to the wall 256. The second side 245 is an inclined surface that faces downstream. The inclined surface or second side 245 can follow a streamline of the cooling airflow C passing through the cooling air circuit 130.

A first ramp angle 247 can be defined as the measure of the angle between the axial line 241 and the first side 243 of the ramp 237. A second ramp angle 249 can be measured from the axial line 241 to the second side 245 of the ramp 237. By way of illustration, the second ramp angle 249 can be greater than the first ramp angle 247. However, it is contemplated that the second ramp angle 249 can be equal to or less than the first ramp angle 247.

It is contemplated that at least a portion of the first or second sides 243, 245 can be linear. The linear portion of the first or second sides 243, 245 can be defined as the continuous portion of the first or second side 243, 245 in which the first or second ramp angle 247, 249 maintains at a constant magnitude or value. It is further contemplated that the at least a portion of the first or second sides 243, 245 can be non-linear, where the first or second ramp angle 247, 249 varies across the inlet passage 236.

A third diameter 255 can be measured across the platform inlet 250. The third diameter 255 can be larger than a second diameter 268 measured across the inlet passage 236 at the peak 239. That is, a local cross-sectional area of the cooling air circuit 230 at the platform inlet 250 of the platform cooling passage 232 can be greater than the reduced cross-sectional area at the deflector 234. However, it is contemplated that the third diameter 255 can be less than or equal to the second diameter 268.

As illustrated, by way of non-limiting example, the deflector 234 can be spaced from the platform inlet 250 an upstream distance 251. The upstream distance 251 can be measured from an intersection 253 to the platform inlet 250, where the intersection 253 defined as the point in which the wall 256 and the second side 245 of the deflector 234 converge. It is contemplated that the upstream distance 251 can be six times the measurement of the second diameter 268 or less upstream of the platform cooling passage 232.

Figure 7:
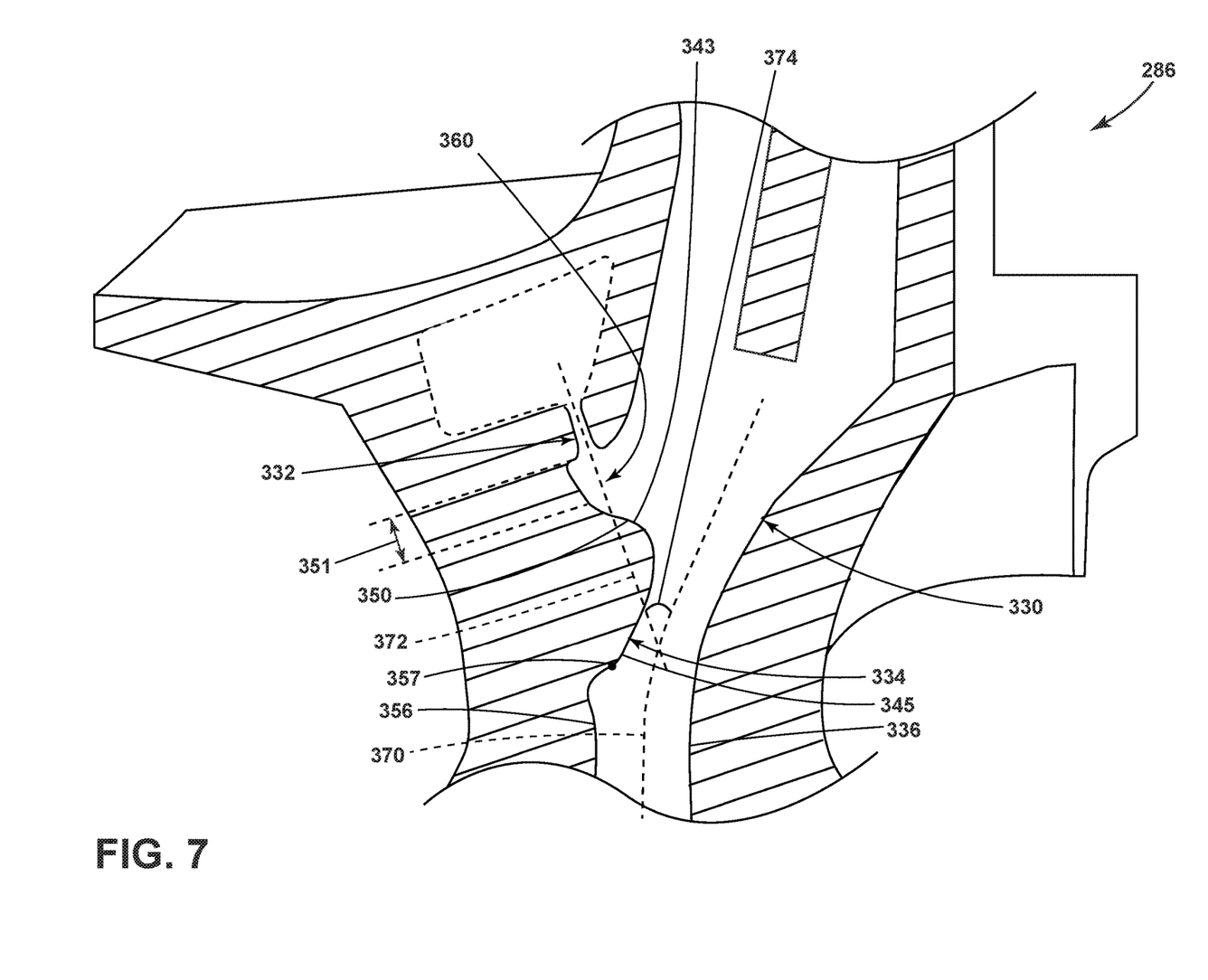
FIG. 7 is another variation of the enlarged schematic cross-section of FIG. 3.

FIG. 7 is another example of a schematic cross section of an airfoil assembly 286. The airfoil assembly 286 is similar to the airfoil assembly 86, therefore, like parts will be identified with like numerals increased by 200, with it being understood that the description of the like parts of the airfoil assembly 86 applies to the airfoil assembly 286, unless otherwise noted.

The airfoil assembly 286 can include a cooling air circuit 330, a platform cooling passage 332, and a deflector 334. The deflector 334 can protrude from or be coupled to a wall 356 so that the deflector 334 extends into an inlet passage 336 of the cooling air circuit 330. The deflector 334, by way of non-limiting example, can be spaced from a platform inlet 350 an upstream distance 351.

Optionally, the deflector 334 can include a radial inflection point 357. While illustrated on a downstream incline or a second side 345, it is contemplated that the radial inflection point 357 can be on an upstream incline or first side 343 of the deflector 334.

A turn 360 can be measured as an angle 374 between the first centerline 370 and the second centerline 372. The turn 360 can have an angle between and including 5 to 180 degrees.

Materials used to form the outer wall 118 or substrate include, but are not limited to, steel, refractory metals such as titanium, or superalloys based on nickel, cobalt, or iron, and ceramic matrix composites. The superalloys can include those in equiaxed, directionally solidified, and crystal structures. The substrate can be formed by a variety of methods, including additive manufacturing, casting, electroforming, or direct metal laser melting, in non-limiting examples. The airfoil 108 can be an additively manufactured component. As used herein, an "additively manufactured" component will refer to a component formed by an additive manufacturing (AM) process, wherein the component is built layer-by-layer by successive deposition of material. AM is an appropriate name to describe the technologies that build 3D objects by adding layer-upon-layer of material, whether the material is plastic, ceramic, or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination. It is also contemplated that a process utilized could include printing a negative of the part, either by a refractory metal, ceramic, or printing a plastic, and then using that negative to cast the component.

Benefits of the present disclosure include isolating one airstream from particles by biasing the flow to anther air stream.

Another benefit of the deflector or cooling air circuit geometry is an aerodynamic benefit so that the cooling air circuit can be feed at a higher pressure.

Yet another benefit includes the deflector in the cooling air circuit that can direct cooling airflow so that fewer particles in the cooling airflow reach the platform.

This written description uses examples to describe aspects of the disclosure described herein, including the best mode, and also to enable any person skilled in the art to practice aspects of the disclosure, including making and using any devices or systems and performing any incorporated methods. Any portion of the cooling air circuit can include cross sectional shapes that include, but are not limited to, circles, ovals, rounded rectangles, substantially square, teardrop, triangle, or combinations therein to form irregular shapes. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. An airfoil assembly for a turbine engine that include a platform having upper and lower opposing surfaces, a dovetail depending from the lower surface, an airfoil extending from the upper surface and having an outer wall bounding an interior and defining a pressure side and a suction side extending between a leading edge and a trailing edge to define a chord-wise direction and extending radially between a root and a tip to define a span-wise direction, with the root being adjacent the platform, a cooling air circuit passing through the dovetail and extending into the interior of the airfoil, a platform cooling passage extending into the platform and having a platform inlet fluidly coupled to the cooling air circuit, and a deflector provided in the cooling air circuit upstream of the platform inlet.

2. The airfoil assembly of clause 1 wherein the deflector projects into the cooling air circuit.

3. The airfoil assembly of any preceding clause wherein the deflector at least locally reduces a cross-sectional area of the cooling air circuit at the deflector to define a reduced cross-sectional area.

4. The airfoil assembly of any preceding clause wherein a local cross-sectional of the cooling air circuit at the platform inlet is less than the reduced cross-sectional area.

5. The airfoil assembly of any of clauses 1-3 wherein a local cross-sectional of the cooling air circuit at the platform inlet is greater than the reduced cross-sectional area.

6. The airfoil assembly of any preceding clause wherein the deflector forms a turn for a cooling airflow leaving the cooling air circuit and entering the platform inlet of the platform cooling passage.

7. The airfoil assembly of any preceding clause wherein the turn is at least 5 degrees.

8. The airfoil assembly of any preceding clause wherein the deflector is a ramp.

9. The airfoil assembly of any preceding clause wherein the ramp has an inclined surface facing downstream.

10. The airfoil assembly of any preceding clause wherein the inclined surface follows a streamline of a cooling airflow passing through the cooling air circuit.

11. The airfoil assembly of any preceding clause wherein the inclined surface is linear.

12. The airfoil assembly of any preceding clause wherein the inclined surface is non-linear.

13. The airfoil assembly of any preceding clause wherein the airfoil is a rotatable blade.

14. The airfoil assembly of any preceding clause wherein the airfoil is a non-rotatable vane.

15. The airfoil assembly of any preceding clause wherein the cooling air circuit, the platform cooling passage, or the deflector includes at least one hole through which particles in a cooling airflow can exit the airfoil assembly.

16. An airfoil assembly for a turbine engine that includes a platform having first and second opposing surfaces, an airfoil extending from one of the first and second surfaces and having an outer wall bounding an interior and defining a pressure side and a suction side extending between a leading edge and a trailing edge to define a chord-wise direction and extending radially between a root and a tip to define a span-wise direction, with the root being adjacent the one of the first and second surfaces, a cooling air circuit extending into the airfoil interior, a platform cooling passage extending into the platform and having a platform inlet fluidly coupled to the cooling air circuit, and a deflector provided in the cooling air circuit upstream of the platform inlet.

17. The airfoil assembly of any preceding clause wherein the deflector projects into the cooling air circuit.

18. The airfoil assembly of any preceding clause wherein the deflector at least locally reduces a cross-sectional area of the cooling air circuit at the deflector to define a reduced cross-sectional area.

19. The airfoil assembly of any preceding clause wherein the cooling air circuit, the platform cooling passage, or the deflector includes at least one hole through which particles in a cooling airflow can exit the airfoil assembly.

20. The airfoil assembly of any preceding clause wherein the deflector forms a turn for air leaving the cooling air circuit and entering the platform inlet.

21. The airfoil assembly of any preceding clause wherein the turn is at least 5 degrees.

22. The airfoil assembly of any preceding clause wherein the deflector includes a contoured surface.

23. The airfoil assembly of any preceding clause wherein the contoured surface of the deflector includes an inflection point.

What is claimed is:

1. An airfoil assembly for a turbine engine comprising:
   a platform having upper and lower opposing surfaces;
   a dovetail depending from the lower surface;
   an airfoil extending from the upper surface and having an outer wall bounding an interior and defining a pressure side and a suction side extending between a leading edge and a trailing edge to define a chord-wise direction and extending radially between a root and a tip to define a span-wise direction, with the root being adjacent the platform;
   a cooling air circuit passing through the dovetail and extending into the interior of the airfoil;
   a platform cooling passage extending into the platform and having a platform inlet fluidly coupled to the cooling air circuit; and a deflector provided in the cooling air circuit upstream of the platform inlet.

2. The airfoil assembly of claim 1 wherein the deflector projects into the cooling air circuit.

3. The airfoil assembly of claim 1 wherein the deflector reduces at least one dimension of a cross-sectional area of the cooling air circuit at the deflector.

4. The airfoil assembly of claim 3 wherein a local cross-sectional of the cooling air circuit at the platform inlet is less than the reduced cross-sectional area.

5. The airfoil assembly of claim 3 wherein a local cross-sectional of the cooling air circuit at the platform inlet is greater than the reduced cross-sectional area.

6. The airfoil assembly of claim 1 wherein the deflector forms a turn for a cooling airflow leaving the cooling air circuit and entering the platform inlet of the platform cooling passage.

7. The airfoil assembly of claim 6 wherein the turn is at least 5 degrees.

8. The airfoil assembly of claim 1 wherein the deflector is a ramp.

9. The airfoil assembly of claim 8 wherein the ramp has an inclined surface facing downstream.

10. The airfoil assembly of claim 9 wherein the inclined surface follows a streamline of a cooling airflow passing through the cooling air circuit.

11. The airfoil assembly of claim 9 wherein the inclined surface is linear.

12. The airfoil assembly of claim 9 wherein the inclined surface is non-linear.

13. The airfoil assembly of claim 1 wherein the airfoil is a rotatable blade.

14. The airfoil assembly of claim 1 wherein the airfoil is a non-rotatable vane.

15. The airfoil assembly of claim 1 wherein the cooling air circuit, the platform cooling passage, or the deflector includes at least one hole through which particles in a cooling airflow can exit the airfoil assembly.

16. An airfoil assembly for a turbine engine comprising:
a platform having first and second opposing surfaces;
an airfoil extending from one of the first and second surfaces and having an outer wall bounding an interior and defining a pressure side and a suction side extending between a leading edge and a trailing edge to define a chord-wise direction and extending radially between a root and a tip to define a span-wise direction, with the root being adjacent the one of the first and second surfaces;
a cooling air circuit extending into the airfoil interior;
a platform cooling passage extending into the platform and having a platform inlet fluidly coupled to the cooling air circuit; and
a deflector provided in the cooling air circuit upstream of the platform inlet.

17. The airfoil assembly of claim 16 wherein the deflector projects into the cooling air circuit.

18. The airfoil assembly of claim 16 wherein the deflector at least locally reduces a cross-sectional area of the cooling air circuit at the deflector to define a reduced cross-sectional area.

19. The airfoil assembly of claim 16 wherein the cooling air circuit, the platform cooling passage, or the deflector includes at least one hole through which particles in a cooling airflow can exit the airfoil assembly.

20. The airfoil assembly of claim 16 wherein the deflector forms a turn for air leaving the cooling air circuit and entering the platform inlet.

* * * * *

UNITED STATES PATENT AND TRADEMARK OFFICE
CERTIFICATE OF CORRECTION

PATENT NO. : 11,131,213 B2
APPLICATION NO. : 16/733377
DATED : September 28, 2021
INVENTOR(S) : Fishback et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 67 days.

Signed and Sealed this
Twenty-fourth Day of January, 2023

Katherine Kelly Vidal
*Director of the United States Patent and Trademark Office*